(12) United States Patent
Aslanov et al.

(10) Patent No.: US 10,557,756 B2
(45) Date of Patent: Feb. 11, 2020

(54) SHEARING INTERFEROMETER USING TWO OPPOSING SHEARING PLATES FOR LASER

(71) Applicant: SAMSUNG DISPLAY CO., LTD., Yongin-si, Gyeonggi-do (KR)

(72) Inventors: Emil Aslanov, Yongin-si (KR); Alexander Voronov, Yongin-si (KR); Gyoo Wan Han, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/154,807

(22) Filed: Oct. 9, 2018

(65) Prior Publication Data
US 2019/0154514 A1    May 23, 2019

(30) Foreign Application Priority Data
Nov. 23, 2017  (KR) .......................... 10-2017-0157157

(51) Int. Cl.
 *G01J 9/02* (2006.01)
(52) U.S. Cl.
 CPC ..... *G01J 9/0215* (2013.01); *G01J 2009/0219* (2013.01)
(58) Field of Classification Search
 CPC .......................... G01J 9/0215; G01J 2009/0219
 See application file for complete search history.

(56) References Cited

U.S. PATENT DOCUMENTS

| 4,025,195 A * | 5/1977 | Ebersole ............... G01J 9/0215 356/71 |
| 5,270,792 A | 12/1993 | Snyder |
| 9,400,175 B2 | 7/2016 | Luthi et al. |
| 2017/0219458 A1 * | 8/2017 | Okuma .................. G01M 11/00 |

FOREIGN PATENT DOCUMENTS

| KR | 101629760 B1 | 6/2016 |
| KR | 101664470 B1 | 10/2016 |

OTHER PUBLICATIONS

M.V.R.K. Murty, The Use of a Single Plane Parallel Plate as a Lateral Shearing Interferometer with a Visible Gas Laser Source, 1964, p. 531-534, vol. 3, No. 4, Applied Optics.

* cited by examiner

*Primary Examiner* — Hwa Andrew Lee
(74) *Attorney, Agent, or Firm* — Cantor Colburn LLP (57) ABSTRACT

A shearing interferometer includes first and second shearing plates disposed opposite to each other. The first shearing plate includes a first front surface and a first back surface, and splits an input beam input to the first front surface into first and second beams reflected at the first front and back surfaces, respectively. The second shearing plate includes a second front surface and a second back surface. The second shearing plate splits the first beam into third and fourth beams reflected at the second front and back surfaces, respectively, and splits the second beam into fifth and sixth beams reflected at the second front and back surfaces, respectively. Each of the first and second shearing plates has a thickness which limits a phase delay between the fourth beam and the fifth beam to a degree determined to allow interference to occur between the fourth beam and the fifth beam.

8 Claims, 5 Drawing Sheets

SHEARING INTERFEROMETER USING TWO OPPOSING SHEARING PLATES FOR LASER

This application claims priority to Korean Patent Application No. 10-2017-0157157, filed on Nov. 23, 2017, and all the benefits accruing therefrom under 35 U.S.C. § 119, the content of which in its entirety is herein incorporated by reference.

BACKGROUND

1. Field

Embodiments of the disclosure relate to an apparatus for performing optical experiments and measurements, and more particularly, to a shearing interferometer for laser.

2. Related Art

Shearing interferometers may be used to perform various optical experiments and measurements. Currently, various types of shearing interferometers are used, such as a shearing interferometer manufactured by Thorlab® and a dynamic lateral shearing interferometer manufactured by Blue Sky Research Inc., which is disclosed in U.S. Pat. No. 5,270,792.

SUMMARY

In a dynamic lateral shearing interferometer, an interference fringe pattern may be generated by periodically vibrating a shearing plate at a small angle, so that an adjustment direction for collimation of beams is displayed on a display surface such as a screen. The interference pattern at an accurate collimation time is suddenly changed into a flickering form. However, when the pulse duration of a laser beam is in a femtosecond (fs) range, the phase delay between beams reflected from two parallel surfaces of the shearing plate does not cause any interference.

Embodiments provide a shearing interferometer capable of generating an interference pattern with respect to laser having a pulse short enough to destroy interference due to a phase delay occurring in a shearing plate.

According to an embodiments of the disclosure, a shearing interferometer includes: a first shearing plate including a first front surface and a first back surface, where the first shearing plate splits an input beam input to the first front surface into a first beam reflected at the first front surface and a second beam reflected at the first back surface; and a second shearing plate including a second front surface and a second back surface, where the second shearing plate is disposed opposite to the first shearing plate, the second shearing plate splits the first beam into a third beam reflected at the second front surface and a fourth beam reflected at the second back surface, and the second shearing plate splits the second beam into a fifth beam reflected at the second front surface and a sixth beam reflected at the second back surface. In such an embodiment, each of the first and second shearing plates has a thickness which limits a phase delay between the fourth beam and the fifth beam to a degree determined to allow interference to occur between the fourth beam and the fifth beam.

In an embodiment, the first shearing plate may be disposed inclined at an angle of about 45 degrees with a tolerance of 5% with respect to an optical axis of the input beam, and the second shearing plate may be disposed opposite to the first shearing plate to be symmetrical to the first shearing plate.

In an embodiment, the first and second shearing plates may have a same thickness as each other.

In an embodiment, the thicknesses of the first and second shearing plates may satisfy the following inequation:

$$Tpl1, Tpl2 < D*n/2.$$

In such an embodiment, Tpl1 denotes the thickness of the first shearing plate, Tpl2 denotes the thickness of the second shearing plate, D denotes a diameter of the input beam, and n denotes a refractive index of the first and second shearing plates.

In an embodiment, the first and second shearing plates may include a same material as each other.

In an embodiment, the first and second shearing plates may include fused silica.

In an embodiment, a diameter of the input beam may be in a range of about 0.67 millimeter (mm) to about 134 mm, and a wavelength of the input beam may be in a range of about 100 nanometers (nm) to about 3 micrometers (μm), and the thickness of each of the first and second shearing plates may be in a range of about 0.5 mm to about 100 mm.

In an embodiment, the first and second shearing plates may be fixed to a housing.

In an embodiment, the shearing interferometer may further include a diffuser disposed on a path through which the third to sixth beams advance.

In an embodiment, the shearing interferometer may further include a detector disposed on a path through which the third to sixth beams advance to record the interference between the third to sixth beams.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the invention will be described in detail with reference to the accompanying drawings.

Figure 1:
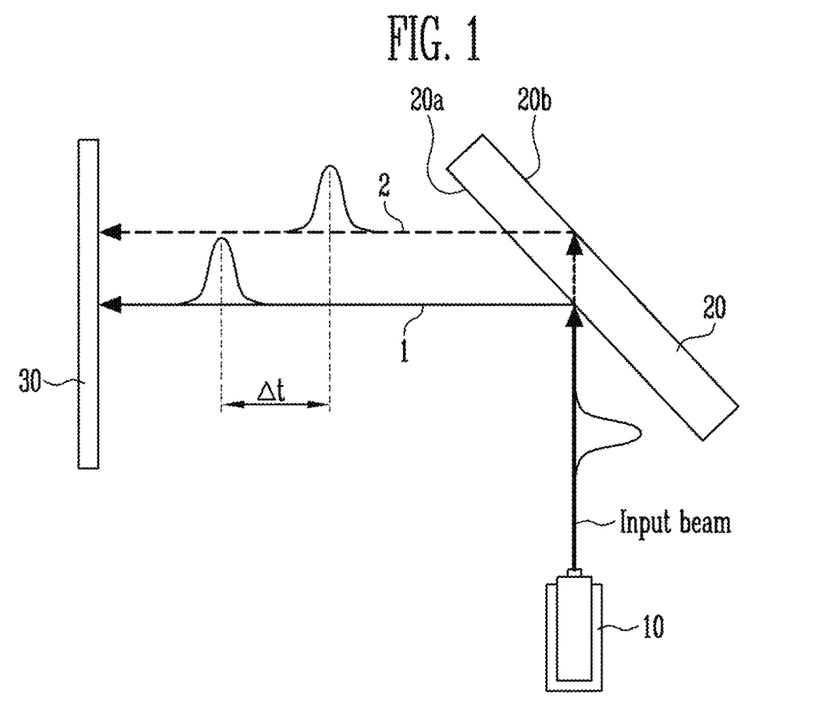
FIG. 1 illustrates an exemplary embodiment of a shearing interferometer system.

FIG. 1 illustrates an exemplary embodiment of a shearing interferometer system.

Referring to FIG. 1, an exemplary embodiment of the shearing interferometer system includes a laser generator 10, a shearing plate 20, and a screen 30. Alternatively, the screen 30 may be omitted when another component or means capable of displaying and/or recording an interference pattern exists.

The laser generator 10 emits a laser beam in the form of collimated light by oscillating laser. The laser beam is input to the shearing plate 20. Hereinafter, the laser beam input to the shearing plate 20 will be referred to as an "input beam."

The shearing plate 20 may be a single plate including or made of a material such as glass, and include two opposing main surfaces disposed in parallel to each other. In one embodiment, for example, the shearing plate 20 may include a front surface 20a and a back surface 20b, which are parallel to each other, and the input beam may be input to the front surface 20a of the shearing plate 20.

A portion of the input beam is reflected at the front surface 20a of the shearing plate 20 to form a first beam 1, and another portion of the input beam passed through the front surface 20a is reflected at the back surface 20b of the shearing plate 20 to form a second beam 2.

The input beam is not input in a normal direction with respect to the shearing plate 20 but may be input to the shearing plate 20 at a predetermined angle, e.g., an angle of about 45 degrees. Accordingly, the first beam 1 and the second beam 2 are displaced in a lateral direction of the shearing plate 20. That is, the first beam 1 and the second beam 2 are laterally sheared.

The second beam 2 has a delayed phase as compared with the first beam 1. Specifically, a phase delay (Δt) between the first beam 1 and the second beam 2 satisfies the following equation:

$$\Delta t = \frac{2n \cdot a}{c \cdot \sin 45°}$$

In the equation above, a denotes a thickness of the shearing plate 20, c denotes a light speed, and n denotes a refractive index of the shearing plate 20. In the equation above, it is assumed that the input beam is input at an angle of 45 degrees to the shearing plate 20.

If the screen 30 or the like is disposed on a path through which the first beam 1 and the second beam 2 are emitted, an interference pattern generated by interference between the first beam 1 and the second beam 2 appears on the screen 30. Accordingly, the interference between the first beam 1 and the second beam 2 may be displayed and/or recorded.

However, when the input beam is a laser beam having a pulse short enough to destroy interference due to a phase delay occurring in the shearing plate, e.g., a laser beam generated in picosecond or femtosecond laser, the interference between the first beam 1 and the second beam 2 may be destroyed. When the shearing plate 20 is a plate having a thickness of 10 millimeters (mm), which is made of fused silica and a laser beam having a pulse width of 355 nanometers (nm) is input to the shearing plate 20, for example, a phase delay Δt of about 21 picoseconds (ps) is generated between the first beam 1 and the second beam 2. As for picosecond laser, particularly, femtosecond laser, the phase delay Δt of 21 picoseconds does not allow interference to occur between the reflected beams (i.e., the first beam 1 and the second beam 2), and therefore, the interference pattern may be destroyed.

Accordingly, an embodiment of the disclosure provides a shearing interferometer for laser, which enables optical experiments and measurements to be performed by generating an interference pattern even with respect to laser having a short pulse, such as picosecond or femtosecond laser.

Figure 2:
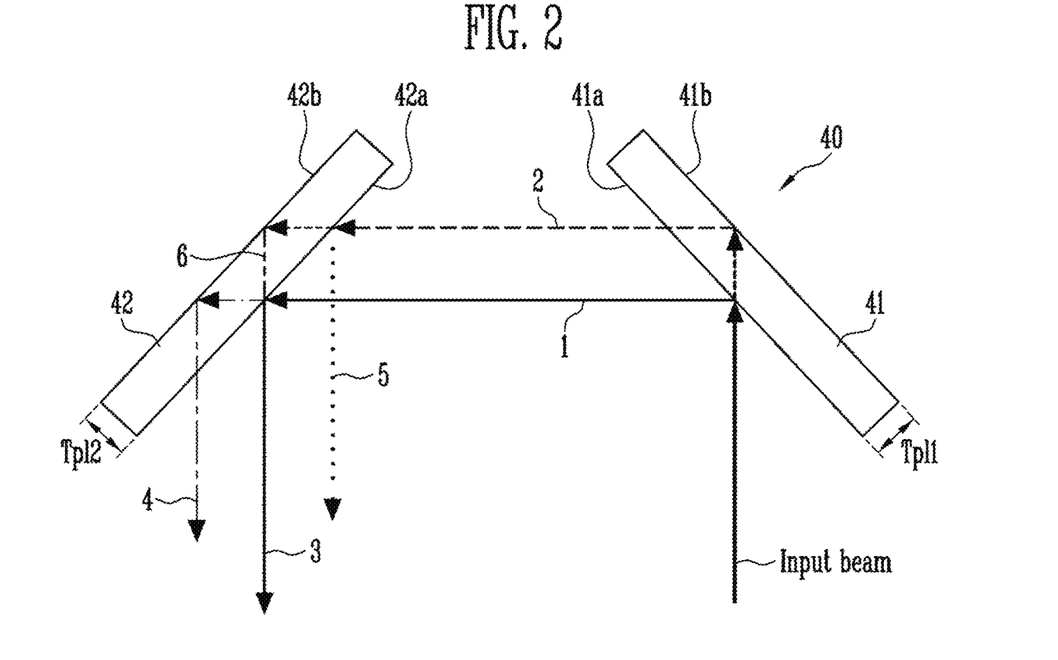
FIG. 2 illustrates a shearing interferometer according to an embodiment of the disclosure.
Figure 3A:
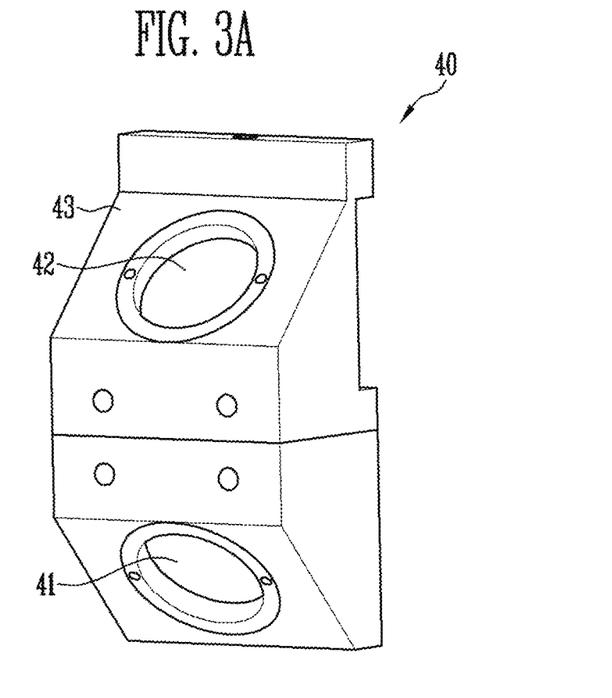
FIGS. 3A to 3C illustrate mechanical design structures and sections of the shearing interferometer according to an embodiment of the disclosure.
Figure 3B:
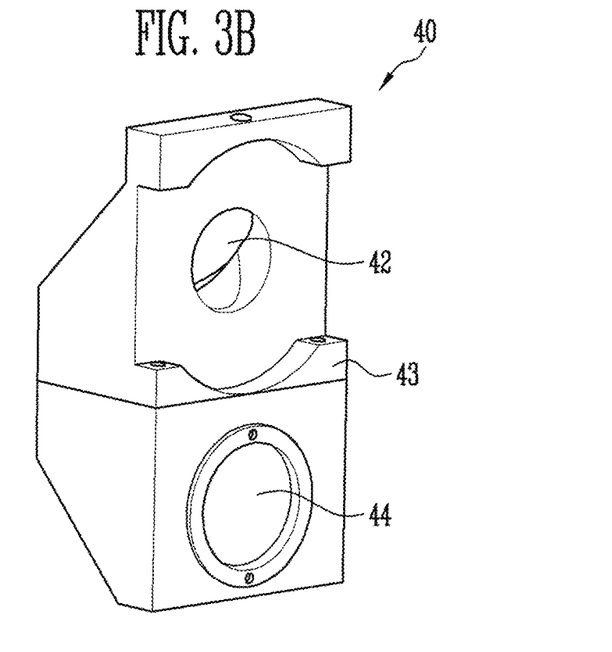
Figure 3C:
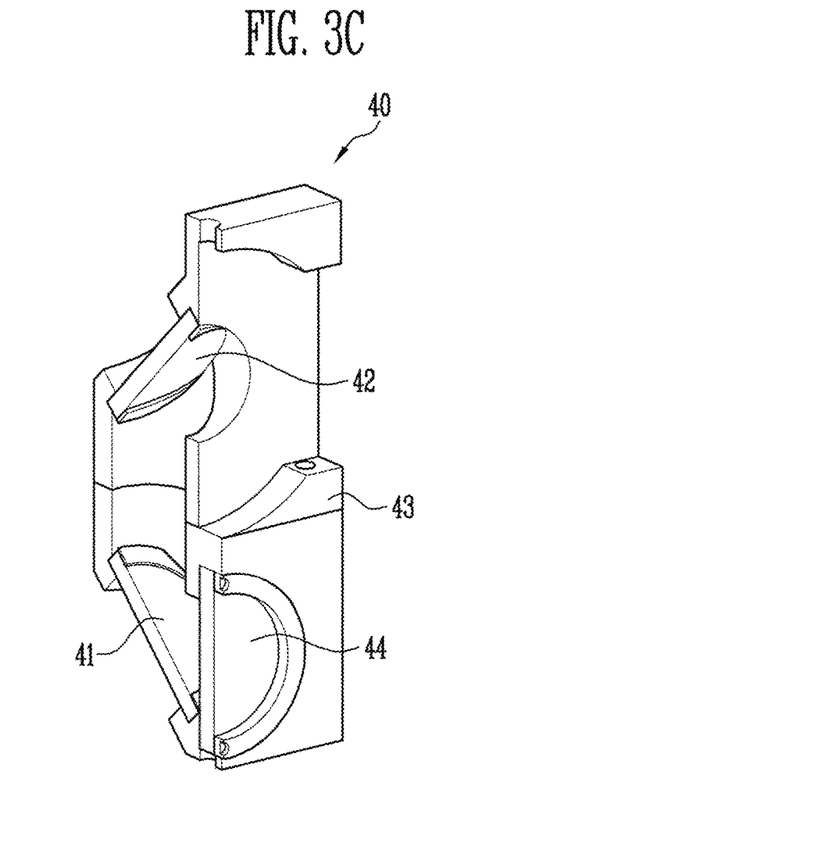

FIG. 2 illustrates a shearing interferometer according to an embodiment of the disclosure. FIGS. 3A to 3C illustrate mechanical design structures and sections of the shearing interferometer according to an embodiment of the disclosure.

First, referring to FIG. 2, an embodiment of the shearing interferometer 40 may include a first shearing plate 41 and a second shearing plate 42, which are opposite to each other. In some embodiments, the first and second shearing plates 41 and 42 are disposed inclined at a predetermined angle with respect to an optical axis of an input beam (e.g., a traveling direction of the input beam), and may be symmetrically disposed opposite to each other. In one embodiment, for example, the first shearing plate 41 may be disposed inclined at an angle of about 45 degrees with a tolerance of 5% with respect to the optical axis of an input beam, and the second shearing plate 42 may be disposed opposite to the first shearing plate 41 such that the first shearing plate 41 and the second shearing plate 42 are symmetrical (or a symmetrical reflection) to each other. In some embodiments, the first and second shearing plates 41 and 42 may include or be made of a same material as each other, and have a same thickness as each other.

The first shearing plate 41 has two opposing main surfaces 41a and 41b disposed in parallel to each other. Hereinafter, the front surface 41a of the first shearing plate 41 will be referred to as a first front surface, and the back surface 41b of the first shearing plate 41 will be referred to as a first back surface.

The first shearing plate 41 splits an input beam into a first beam 1 and a second beam 2. Specifically, the first shearing plate 41 splits the input beam into the first beam 1 reflected at the first front surface 41a, and the second beam 2 reflected at the first back surface 41b while having a phase delay.

The second shearing plate 42 has two opposing main surfaces 42a and 42b disposed in parallel to each other. Hereinafter, the front surface 42a of the second shearing plate 42 will be referred to as a second front surface, and the back surface 42b of the second shearing plate 42 will be referred to as a second back surface.

The second shearing plate 42 splits the first beam 1 into a third beam 3 and a fourth beam 4, and splits the second beam 2 into a fifth beam 5 and a sixth beam 6. Specifically, the second shearing plate 42 splits the first beam 1 into the third beam 3 reflected at the second front surface 42a and the fourth beam 4 reflected at the second back surface 42b, and splits the second beam 2 into the fifth beam 5 reflected at the second front surface 42a and the sixth beam 6 reflected at the second back surface 42b.

In an embodiment of the disclosure, the first and second shearing plates 41 and 42 are configured and disposed in a way such that a phase delay occurring between the fourth beam 4 and the fifth beam 5 is limited to a degree determined to allow interference to occur and to be observed. In one embodiment, for example, the first and second shearing plates 41 and 42 may be configured and disposed to generate an interference pattern between the fourth beam 4 and the fifth beam 5 with respect to an input beam emitted from a picosecond or femtosecond laser.

In an embodiment, the thicknesses Tpl1 and Tpl2 of the first and second shearing plates 41 and 42 may be set (or designed) by considering the pulse width of a target laser and/or the range thereof. In one embodiment, for example, the first and second shearing plates 41 and 42 may have a thicknesses which limits a phase delay between the fourth beam 4 and the fifth beam 5 to a degree determined to allow interference to occur between the fourth beam 4 and the fifth beam 5, which are split from the input beam of the target laser by the first and second shearing plates 41 and 42. In an embodiment, where the first and second shearing plates 41 and 42 have a same thickness as each other, and are disposed inclined at an angle of about 45 degrees to be opposite to each other, the thicknesses Tpl1 and Tpl2 of the first and second shearing plates 41 and 42 may be set (or designed) to satisfy the following inequation:

$$Tpl1, Tpl2 < D*n/2$$

In the inequation above, Tpl1 denotes a thickness of the first shearing plate 41, Tpl2 denotes a thickness of the second shearing plate 42, D denotes a diameter of the input beam, and n denotes a refractive index of the first and second shearing plates 41 and 42.

In some embodiments, the first and second shearing plates 41 and 42 may include or be made of a same material as each other. In one embodiment, for example, both of the first and second shearing plates 41 and 42 may include or be made of fused silica. Also, in some embodiments, when the diameter of an input beam emitted from target laser to be sheared is in a range of about 0.67 mm to about 134 mm, and the wavelength of the input beam is in a range of 100 nm to about 3 micrometers (μm), the thicknesses Tpl1 and Tpl2 of the first and second shearing plates 41 and 42 may be set (or designed) within a range of about 0.5 mm to about 100 mm. Accordingly, interference occurs between the fourth beam 4 and the fifth beam 5, and an interference pattern may be observed.

In some embodiments, the first shearing plate 41 and the second shearing plate 42, as shown in FIGS. 3A to 3C, may be fixed to a housing 43 with a predetermined angle. In one embodiment, for example, the first and second shearing plates 41 and 42 may be symmetrically fixed to the housing 43 to be inclined at an angle of about 45 degrees with a tolerance of 5% with respect to the optical axis of beams (i.e., input beams from a light source, or the first and second beams 1 and 2) respectively input to the first and second shearing plates 41 and 42. In one embodiment, for example, the first and second shearing plates 41 and 42 may be inclined at an angle of about 45 degrees with a tolerance of 5% with respect to the input beam and the first to sixth beams 1 to 6.

In some embodiments, an entrance window 44 may be disposed in the housing 43. The entrance window 44 may be inclined at a predetermined angle, e.g., an angle of about 45 degrees with a tolerance of 5% with respect to the first shearing plate 41. A laser beam (i.e., an input beam) emitted from a laser source (e.g., the laser generator 10 of FIG. 1) is input to the first shearing plate 41 via the entrance window 44 and then reflected by the first shearing plate 41 to face the second shearing plate 42. In some embodiments, all optical components of the shearing interferometer 40 may be fixed in the housing 43.

In some embodiments, the above-described optical plates, e.g., at least the first and second shearing plates 41 and 42, may include or be made of fused silica suitable for intensive ultraviolet ("UV") laser. In some embodiments, the entrance window 44 may include or be made of fused silica. In one embodiment, for example, all optical plates of the shearing interferometer 40 may be made of fused silica.

Figure 4:
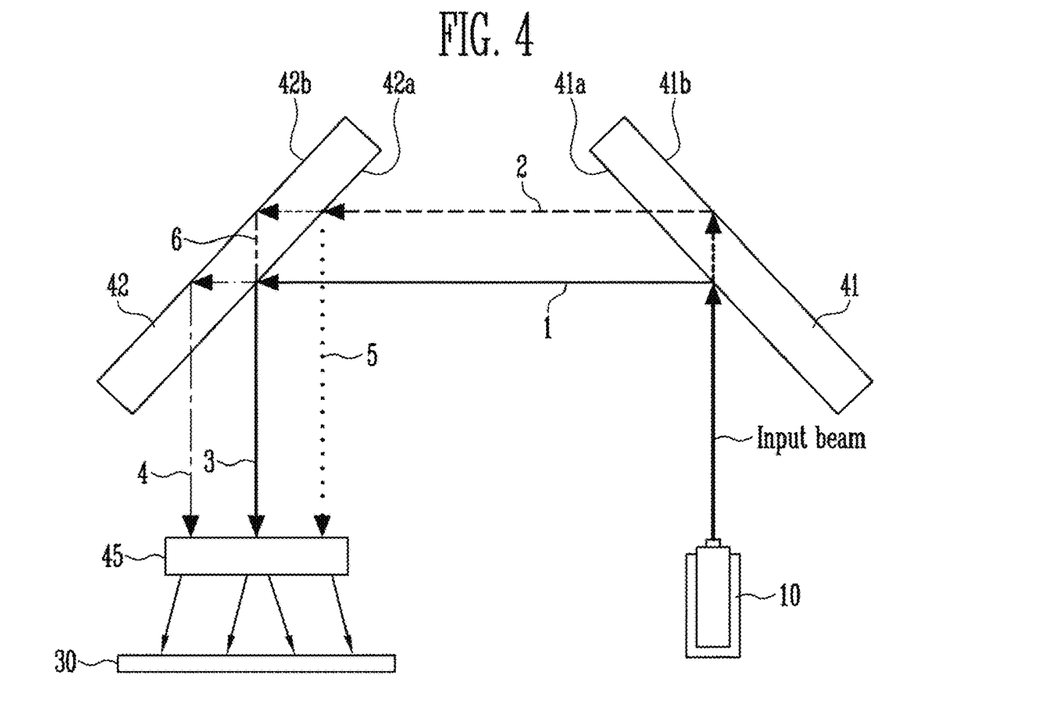
FIGS. 4 and 5 each illustrates a shearing interferometer system according to an embodiment of the disclosure.

FIG. 4 illustrates a shearing interferometer system according to an embodiment of the disclosure. Specifically, FIG. 4 illustrates an embodiment of the shearing interferometer system including the shearing interferometer described above. In FIG. 4, components similar or identical to those of FIGS. 1 to 3C are designated by like reference numerals, and any repetitive detailed descriptions thereof will be omitted.

Referring to FIG. 4, an embodiment of the shearing interferometer system may further include a laser generator 10, a screen 30, and a diffuser 45, in addition to first and second shearing plates 41 and 42. In some embodiments, the diffuser 45 along with the first and second shearing plates 41 and 42 may constitute or define a shearing interferometer.

The laser generator 10 emits a laser beam, and the laser beam (i.e., the input beam) emitted from the laser generator 10 is input to the first shearing plate 41. In some embodiments, the laser generator 10 may be a laser source for generating a laser beam having a short pulse such as UV laser.

In an embodiment, the diffuser 45 may be disposed between the second shearing plate 42 and the screen 30. In such an embodiment, the diffuser 45 may be disposed on a path through which third to sixth beams 3 to 6 advance from the second shearing plate 42 to the screen 30. The diffuser 45 may include or be made of a fluorescent material that converts wavelengths of beams (i.e., the third to sixth beams 3 to 6) reflected by the second shearing plate 42. In such an embodiment, the diffuser 45 may convert beams in a UV range into beams having visible spectra, and diffuses the beams with a large angle.

The screen 30 displays an interference pattern generated by interference between the reflected beams that are converted into the beams having the visible spectra by the diffuser 45. Accordingly, the interference between beams reflected by the second shearing plate 42, particularly, the fourth and fifth beams 4 and 5, may be displayed and/or recorded.

Figure 5:
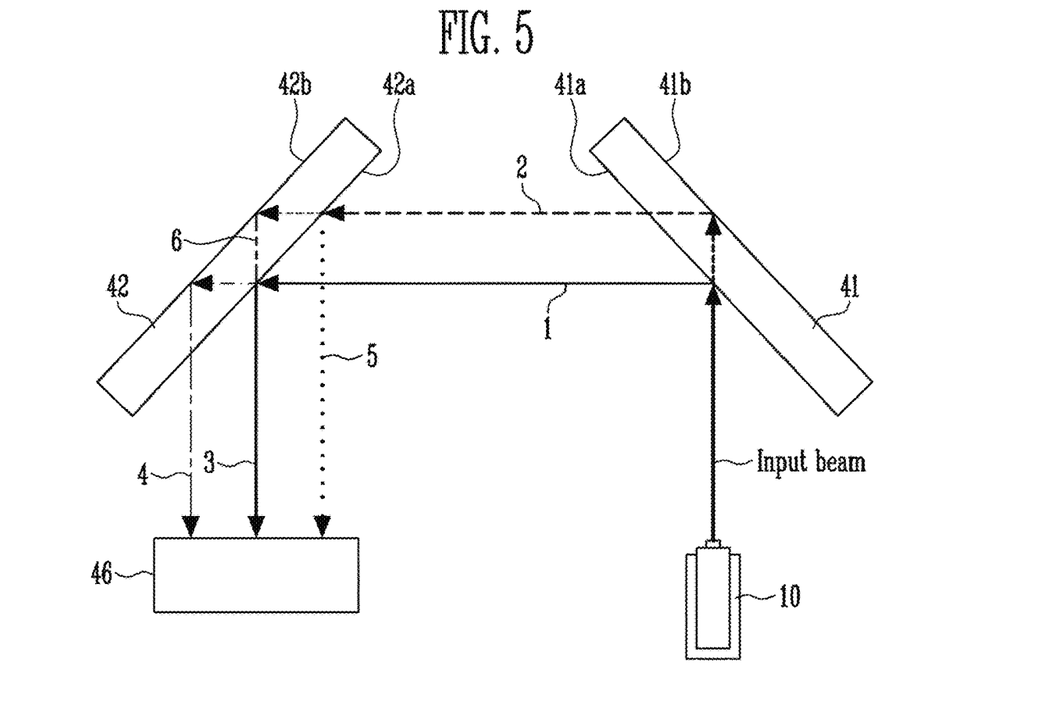

FIG. 5 illustrates a shearing interferometer system according to an embodiment of the disclosure. Specifically, FIG. 5 illustrates an embodiment of the shearing interferometer system including an embodiment of the shearing interferometer described above. In FIG. 5, components similar or identical to those of FIGS. 1 to 4 are designated by like reference numerals, and any repetitive detailed descriptions thereof will be omitted.

Referring to FIG. 5, the shearing interferometer system may further include a laser generator 10 and a detector 46, in addition to first and second shearing plates 41 and 42. In some embodiments, the detector 46 along with the first and second shearing plates 41 and 42 may define or constitute a shearing interferometer.

The detector 46 may disposed on a path through which beams (i.e., third to sixth beams 3 to 6) reflected by the second shearing plate 42 advance. The detector 46 may display and/or record interference between the reflected beams. In one embodiment, for example, the detector 46 may be a detector sensitive to a UV spectrum, to display and/or record interference between beams reflected from the second shearing plate 42, particularly, the fourth and fifth beams 4 and 5.

Figure 6:
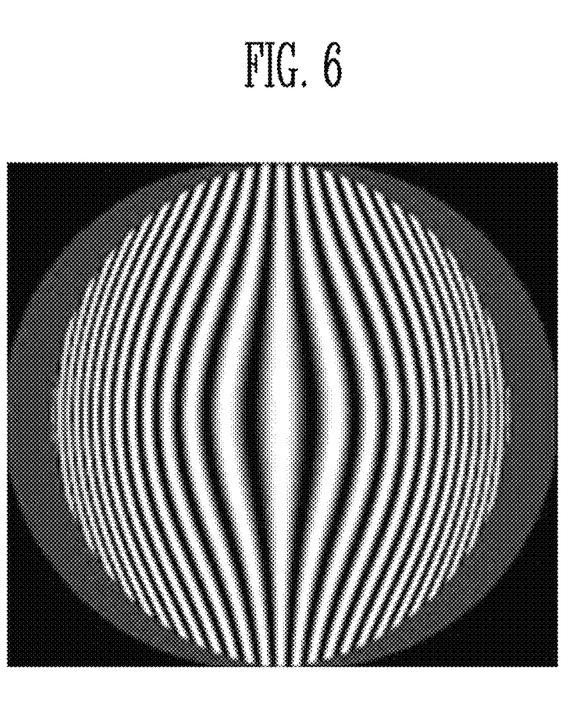
FIG. 6 illustrates an interference pattern generated by the shearing interferometer according to an embodiment of the disclosure.

FIG. 6 illustrates an interference pattern generated by the shearing interferometer according to an embodiment of the disclosure.

Referring to FIG. 6, when a lens being tested is slightly deviated from its focus, the wave front of beams emitted from the lens becomes slightly convex or concave. Therefore, in this situation, a fringe pattern generated by lateral shear appears in a common area between two beams that generate interference. For example, the fringe pattern appears about a common chord connecting two sheared circular boundaries. As an example, the fringe pattern may appear in a shape that is substantially straight and parallel with respect to the common chord. Meanwhile, when beams are accurately collimated, any fringe pattern is not generated in the common area.

As described above, according to an embodiment of the disclosure, the shearing interferometer having a simple structure is implemented using two shearing plates, i.e., the first and second shearing plates 41 and 42, thereby splitting an input beam. In such an embodiment of the disclosure, the first and second shearing plates 41 and 42 are configured and/or disposed by considering the pulse width of target laser. In one embodiment of the disclosure, for example, the first and second shearing plates 41 and 42 are configured and disposed in a way such that, after input beams generated from laser having a very short pulse width, such as picosecond or femtosecond laser, are sequentially reflected by the first and second shearing plates 41 and 42, interference occurs between the reflected beams. Thus, according to an embodiment of the disclosure, an interference pattern between the reflected beams may be observed even when laser having a short pulse, such as picosecond or femtosecond laser is used.

According to embodiments of the disclosure, a shearing interferometer generates an interference pattern with respect to picosecond or femtosecond laser and has a relatively simple structure.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the disclosure as set forth in the following claims.

What is claimed is:

1. A shearing interferometer comprising:
    a first shearing plate including a first front surface and a first back surface parallel to the first front surface, where the first shearing plate splits an input beam when input to the first front surface into a first beam reflected at the first front surface and a second beam reflected at the first back surface;
    a second shearing plate including a second front surface and a second back surface parallel to the second front surface, wherein the second front surface of the second shearing plate is disposed opposite to and facing the first front surface of the first shearing plate, the second shearing plate splits the first beam into a third beam reflected at the second front surface and a fourth beam reflected at the second back surface, and the second shearing plate splits the second beam into a fifth beam reflected at the second front surface and a sixth beam reflected at the second back surface; and
    a diffuser disposed on a path through which the third to sixth beams advance,
    wherein each of the first and second shearing plates has a thickness which limits a phase delay between the fourth beam and the fifth beam to a degree determined to allow interference to occur between the fourth beam and the fifth beam.

2. The shearing interferometer of claim 1, wherein
the first shearing plate is disposed inclined at an angle of about 45 degrees with a tolerance of 5% with respect to an optical axis of the input beam, and
the second shearing plate is disposed opposite to the first shearing plate to be symmetrically disposed opposite to the first shearing plate with respect to an imaginary axis between the first and second shearing plates parallel to the optical axis of the input beam.

3. The shearing interferometer of claim 2, wherein the first and second shearing plates have a same thickness as each other.

4. The shearing interferometer of claim 3, wherein thicknesses of the first and second shearing plates satisfy the following inequation:

$$Tpl1, Tpl2 < D*n/2$$

wherein
Tpl1 denotes the thickness of the first shearing plate,
Tpl2 denotes the thickness of the second shearing plate,
D denotes a diameter of the input beam, and
n denotes a refractive index of the first and second shearing plates.

5. The shearing interferometer of claim 1, wherein the first and second shearing plates comprise a same material as each other.

6. The shearing interferometer of claim 5, wherein the first and second shearing plates comprise fused silica.

7. The shearing interferometer of claim 6, wherein
a diameter of the input beam is in a range of about 0.67 millimeter to about 134 millimeter,
a wavelength of the input beam is in a range of about 100 nanometers to about 3 micrometers, and
the thickness of each of the first and second shearing plates is in a range of about 0.5 millimeter to about 100 millimeters.

8. The shearing interferometer of claim 1, wherein the first and second shearing plates are fixed to a housing.

* * * * *